Figure 1:
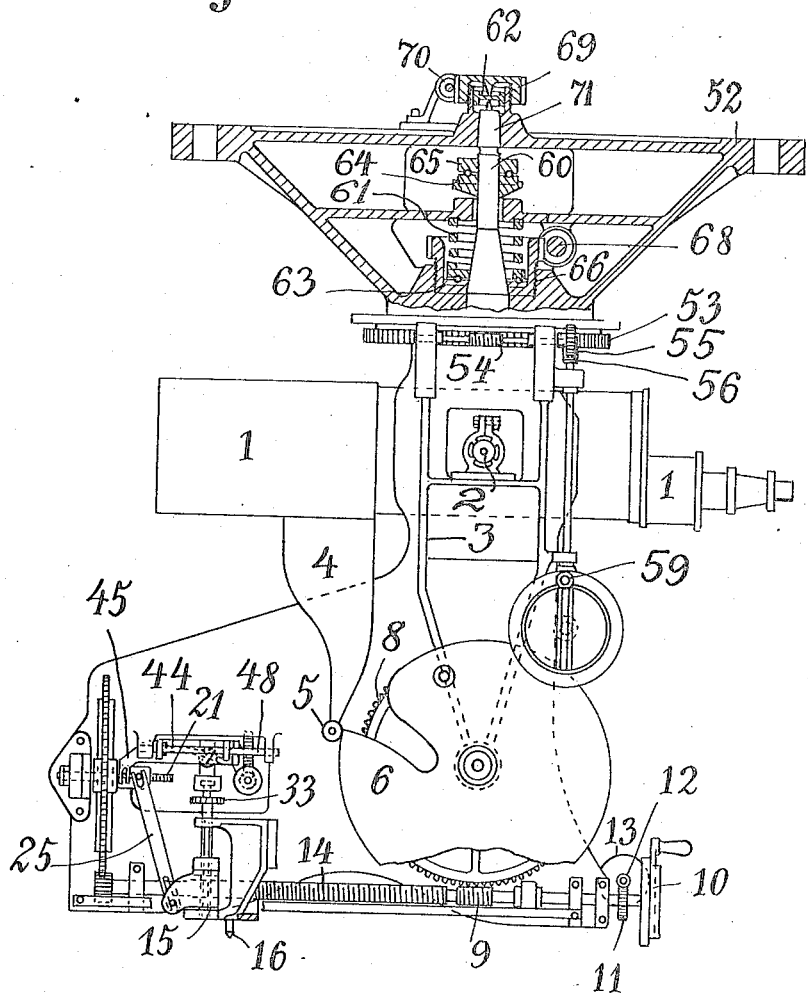

F. ANDERSEN.
RANGE FINDER OR OREOGRAPH.
APPLICATION FILED FEB. 24, 1916

1,196,417.

Patented Aug. 29, 1916.
5 SHEETS—SHEET 1.

Inventor
Fridtjov Andersen,
By [signature] Atty.

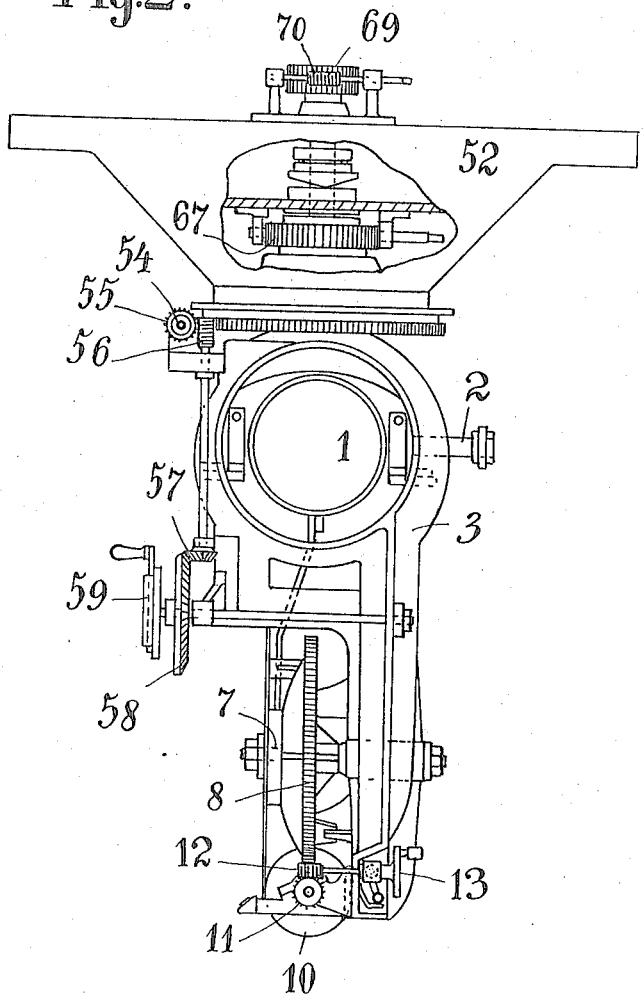

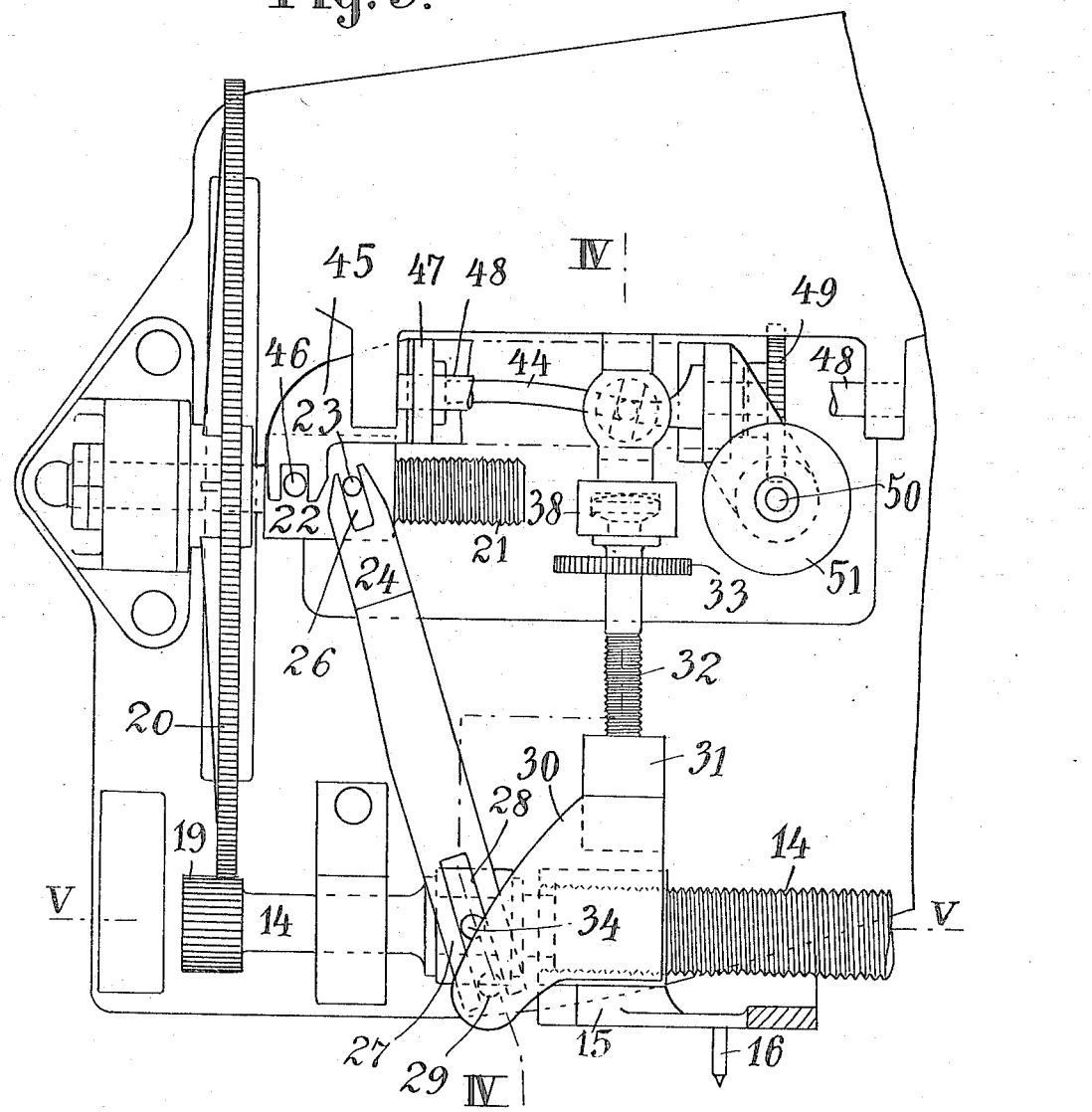

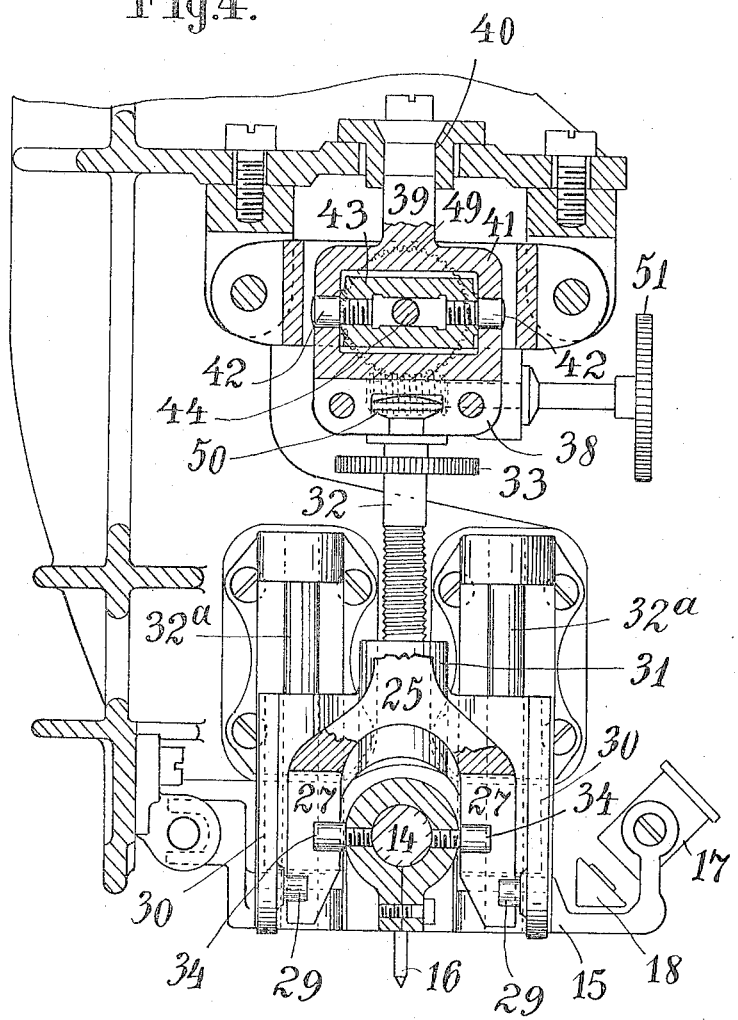

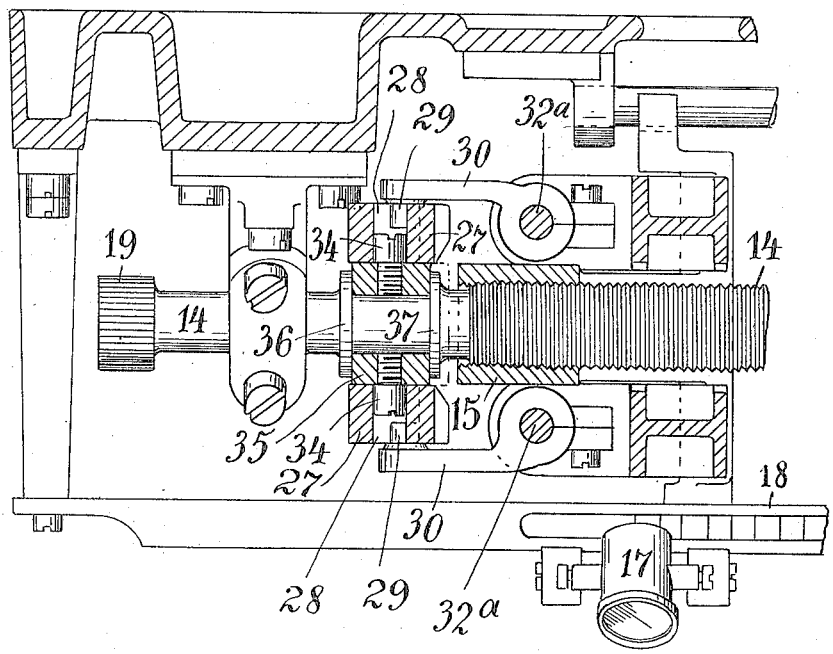

UNITED STATES PATENT OFFICE.

FRIDTJOV ANDERSEN, OF CHRISTIANIA, NORWAY.

RANGE-FINDER OR OREOGRAPH.

1,196,417. Specification of Letters Patent. Patented Aug. 29, 1916.

Application filed February 24, 1916. Serial No. 80,320.

*To all whom it may concern:*

Be it known that I, FRIDTJOV ANDERSEN, a subject of the King of Norway, residing at Christiania, Norway, have invented certain new and useful Improvements in Range-Finders or Oreographs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a range finder or oreograph of the type commonly denominated distance telescope with vertical base line.

The range finder is more particularly designed for use in connection with the automatic sighting and gun training system specified in my previous U. S. Patent No. 1167247 and is adapted to operate the controlling bars of same acting directly on their common point of intersection so as to start the actuating mechanisms of the several guns in accordance with the adjustments of the sight telescope.

The main object of the invention is to provide a range finder of the type referred to the actuating part of which is automatically moved on a small scale in accordance with the object at which the telescope is being directed—so that by means of the said apparatus the several controlling bars for the guns may be adjusted by means of a single sighting device.

The apparatus is especially designed for use on targets moving on a horizontal plane such as the sea—and is particularly adapted for coast defenses or ships.

Further the apparatus according to the invention comprises correction devices for high and low tide and for variations in refraction.

In the drawings: Figure 1 is a side view partly in section of an apparatus embodying the invention. Fig. 2 is an end elevation of the same. Fig. 3 is a sectional view, on a larger scale of the correction devices. Fig. 4 is a section on line IV—IV of Fig. 3 and Fig. 5 is a section on the line V—V of Fig. 3.

The sighting telescope 1 rests on pivots 2 in the fixed frame 3. Extending downwardly from the front end of the telescope is an arm 4, on the lower end of which is mounted a roller 5 engaging a cam 6 by means of which the telescope is guided. This cam is shown in Fig. 1 but removed in Fig. 3 for the purpose of clearness. The cam 6 is pivoted at 7 and carries on the same axis a worm-wheel 8, engaging a screw 9 which can be turned by means of a hand wheel 10. In order to allow of further adjustment the shaft of the hand wheel 10 has secured to it a small worm wheel 11, adapted to be rotated by means of a screw 12 and hand wheel 13.

It will be understood that on operating worm wheel 8 or cam 6, the telescope will be turned on its pivots 2 so as to be pointed at targets at different distances, every point of the curved path of the cam corresponding to a determined distance. The curvature of the cam is so chosen that a certain angular displacement of the same will always correspond to the same displacement of the target at which the telescope 1 is pointed.

The screw 9 is slidably connected with the screw 14 which carries a nut 15 (Figs. 3–5.) Extending downwardly from the nut 15 is a pin 16, and a microscope 17 is moved by the nut along a scale 18. Any adjustment of the telescope by means of the cam 6 will cause the nut 15 to travel a distance which will give on a reduced scale the alterations in the distance to the target aimed at. The amount of these alterations can be read on the scale 18 by means of the microscope 17 and is transmitted to the point of intersection of the controlling bars of the gun training system by means of the pin 16.

The curve-cam 6 (also termed the function plate) is calculated for normal sea level and normal refraction. Its action on the movement of the nut 15 must however be corrected in accordance with the tide as well as with the refraction. The mechanisms provided for this correction are shown on Figs. 3–5. To the end of the screw or shaft 14 is secured a gear wheel 19 meshing with another gear wheel 20 secured to a screw or shaft 21. Mounted on the latter is a nut 22 with laterally projecting studs or trunnions 23. The nut 22 is engaged by the bifurcated end 24 of a lever 25 and the studs 23 of the nut 22 engage in slots 26 on either branch 24 of the fork. In this way the nut is secured against rotation and on the other hand the lever 25 is forced to follow, with its upper end, the motion of the nut 22 caused by turning the screw 21 or 14. The lower end of lever 25 is likewise bifurcated and provided on either branch 27 (Figs 4 and 5) with a longitudinal slot or groove 28. This slot 28 engages on the outside with trunnions 29 secured to projections 30 of a nut 31. This nut 31 engages with a screw 32 and is guided on laterally arranged vertical guide rods 32$^a$. The screw 32 can be turned so as to raise or lower the nut 31 and thereby the trunnions 29, by means of a hand wheel 33. On the inside the slots 28 engage with trunnions 34 on a sleeve or ring 35 loose on shaft 14 but secured against movement relative to the shaft in an axial direction between shoulders 36, 37 on said shaft 14.

It will be seen that the tilting of the lever 25 caused by the operation of the screws 21 or 14,—e. g. every adjustment of the telescope—will cause a longitudinal displacement of the screw 14 together with nut 15, pin 16 and microscope 17. This displacement will be naught when the nut 31 is adjusted by means of the screw 32 so as to bring the trunnions 29 and 34 in a co-axial position; the displacement of the nut 15 operated by the lever 25 will counteract the displacement produced by turning the screw or shaft 14 when the trunnions 29 are in a lower position than the trunnions 34, and will act in the same direction when the trunnions 29 are in a higher position than the trunnions 34.

The above device, as will be seen, allows of correcting the action of the telescope adjustment on the nut 15 viz: on the controlling bars of the gun in accordance with the water level as a determined water level will always correspond to a certain angular position of the screw or shaft 32.

The necessary correction of the action of the cam on the nut 15 in accordance with the refraction is operated by means of the following mechanism: The screw or shaft 32 is journaled at its upper end in a member 38 (Figs. 3 and 4) which is provided on its top with a stud 39 sliding vertically in a sleeve or bearing 40. The part 38 embraces a frame 41 (Fig. 4) in which is pivoted on trunnions 42 a sliding guide 43 engaging a curved guide-pin 44 (Figs. 3 and 4). This guide pin 44 is secured to a fork 45 engaging with its bifurcated end the nut 22 on screw or shaft 21 and also engaging by means of vertical slots the lateral studs 46 of said nut. The fork 45 is guided on rods 48 by means of lateral ears or projections 47 secured to either branch of the fork. These guide rods 48 are partly broken away on Fig. 3 for the purpose of better showing the parts behind same. The curved guide pin 44 is rotatably mounted in the fork 45 and provided at one end with a screw wheel 49 adapted to be operated by means of a screw 50 with hand wheel 51. The fork 45 with the curved guide pin 44, as will be seen, will be taken along with the nut 22 and hereby the curved guide pin 44 will raise the part 38 with screw 32, nut 31 and trunnions 29 so as to adjust the influence of lever 25 on the movement of nut 15, independently of the adjustment performed by screw 32, which is operated in accordance with the water level. It will be seen that in the position of the guide pin 44 shown on Fig. 3 when the nut 22 moves to the right, the device will act to raise the screw 32 with the nut 31 and trunnions 29 thereby gradually reducing the influence of the lever 25 on the screw 14 with nut 15. By adjusting the guide pin 44 by means of the hand wheel 51 the same may however be brought into a perfectly horizontal position in which it will be inoperative and in which the refraction is understood to be normal, or it may be caused to incline in the opposite direction to that shown on the drawing so that by the displacement of the nut 22 to the right the influence of the lever 25 will be gradually increased. Any determined refraction will correspond to a certain position of the guide pin 44, or of the hand wheel 51.

The object of all the above mechanisms is to mark the distance to the target aimed at. The direction is marked out simply by turning the entire apparatus which is for this purpose suspended rotatably in a fixed frame 52. Said frame is provided underneath with a fixed screw wheel 53 meshing with a screw 54 which in turn may be rotated by means of screw wheel and screw 55, 56, conical gears 57, 58 and hand wheel 59.

For the purpose of securing a stable suspension of the apparatus the same is provided on the top with a trunnion 60 which is pressed by the action of a powerful spring 61 against an adjustable socket or center bearing. The spring 61 is located between ball bearings 63, 64, the lowermost of which rests on the bottom of a nut 66 in the frame 52 while the uppermost one abuts against a nut 65 on the trunnion 60. The pressure of the spring may be adjusted by turning the nut 66 which is provided with a screw 67 meshing with a screw 68, and the center bearing 62 can be adjusted by means of a similar nut 69 consisting likewise of a screw wheel engaging a screw 70. Below the center-bearing and the nut 66 the trunnion 60 is guided in upwardly tapering conical bearings of which the uppermost 71 is shown on Fig. 1.

Claims:

1. In a range finder, the combination of a sighting telescope, means for effecting the angular adjustment of the latter, an indicator operated in common with said telescope, and means actuated by the adjusting means to correct the position of said indicator in accordance with the water level.

2. In a range finder, the combination of a sighting telescope, means for effecting the angular adjustment of the latter, an indicator operated in common with said telescope, means actuated by the adjusting means to correct the position of said indicator in accordance with the water level, and means actuated by said adjusting means for correcting the indicator for refraction.

3. In a range finder or oreograph for gun training and elevating systems the combination of a sighting telescope means comprising a cam disk for effecting angular adjustment of the same in a vertical plane, a screw and screw wheel for operating said cam and a nut engaging said screw and adapted to travel along the same, the movements of said nut corresponding to the displacements of the target aimed at with the sighting telescope.

4. In a range finder or oreograph for gun training and elevating systems the combination of a sighting telescope means comprising a cam disk for effecting angular adjustment of the same in a vertical plane, a screw and screw wheel for operating said cam said screw consisting of two parts one of which operates the cam directly while the other one is movable in an axial direction relatively to the former, means for adjusting the said slidable part of the screw with regard to the stationary part, and a nut engaging said slidable screw-member and adapted to travel along the same, the movements of said nut corresponding to the displacements of the target aimed at with the sighting telescope.

5. In a range finder or oreograph for gun training and elevating systems the combination of a sighting telescope means comprising a cam disk for effecting angular adjustment of the same in a vertical plane, a screw and screw wheel for operating said cam said screw consisting of two parts one of which operates the cam directly while the other one is movable in an axial direction relatively to the former, two independent adjusting devices for adjusting the said slidable screw member with regard to the stationary screw member in accordance with the tide and atmospheric refraction and a nut engaging said slidable screw member and adapted to travel along the same, the movements of said nut corresponding to the displacements of the target aimed at with the sighting telescope.

6. In a range finder or oreograph for gun training and elevating systems the combination of a sighting telescope means comprising a screw and screw wheel for effecting angular displacement of the same in a horizontal plane means comprising a cam disk for effecting angular adjustment of the same in a vertical plane, a screw and screwwheel for operating said cam, said cam, screw wheel and screw being so connected to the telescope as to follow the horizontal deviations of the same and a nut engaging said screw and adapted to travel along the same, the movements of said nut corresponding to the displacements of the target aimed at with the sighting telescope.

7. In a range finder or oreograph for gun training and elevating systems the combination of a sighting telescope means comprising a cam disk for effecting angular adjustment of the same in a vertical plane, a screw and screw wheel for operating said cam, said screw consisting of two parts one of which operates the cam directly while the other one is movable in an axial direction relatively to the former, a lever engaging said slidable screw member means actuated by said screw member for turning said lever on its pivot, and two independent adjusting mechanisms for displacing said pivot with regard to the slidable screw member with the object of adjusting the influence of said lever on the slidable screw member in accordance with tide and atmospheric refraction.

8. In a range finder, the combination of a sighting telescope, a cam for effecting angular adjustment of the latter in a vertical plane, a screw for operating said cam having an axially movable portion, a lever having its lower end connected with the latter, a gearing operation by said axially movable screw portion, a nut axially movable by said gearing engaging the upper end of said lever, and a vertically movable member slidably connected with the lower end of the lever.

9. In a range finder, the combination of a sighting telescope, a cam for effecting angular adjustment of the latter in a vertical plane, a screw for operating said cam having an axially movable portion, a lever having its lower end connected with the latter, a gearing operated by said axially movable screw portion, a screw rotatable by said gearing, a nut axially movable by the rotatable screw engaging the upper end of the lever, and a vertically movable nut having trunnions engaging longitudinal slots in the lower end of said lever.

10. In a range finder, the combination of a sighting telescope, a cam for effecting angular adjustment of the latter in a vertical plane, a screw for operating said cam having an axially movable portion, a collar loose on the latter, means to prevent relative axial movement of the collar and the axially movable portion of the screw, a lever having a forked lower end engaging lugs on the collar, a gearing operable by said movable screw portion, a screw rotatable by said gearing, a nut on the rotatable screw having lugs engaging slots in the upper forked end of the lever, and vertically movable trunnions engaging longitudinal slots in the lower end of the lever.

11. In a range finder, the combination of a sighting telescope, a cam for effecting angular adjustment of the latter in a vertical plane, a rotatable screw for adjusting the cam having an axially movable portion, a lever connected with the latter, means operated by the rotation of the screw for moving the lever, a fulcrum for the lower end of the lever, and means to move the fulcrum relatively to the point of connection between the lever and collar.

12. In a range finder, the combination of a sighting telescope, a cam for effecting angular adjustment of the latter in a vertical plane, a rotatable screw for adjusting the cam having an axially movable portion, a lever connected with the latter, means operated by the rotation of the screw for moving the lever, a fulcrum for the lower end of the lever, and means to move the fulcrum vertically in longitudinal slots formed in the end of the lever.

13. In a range finder, the combination of a sighting telescope, a cam for effecting angular adjustment of the latter in a vertical plane, a rotatable screw for adjusting the cam having an axially movable portion, a lever for controlling the axial movement of the latter, a collar on said axially movable portion, means to prevent relative axial movement between the latter and collar, lugs on the collar engaging longitudinal slots in the lower end of the lever, a nut having trunnions engaging the longitudinal slots, means to vertically raise and lower the nut to move the trunnions in said slots past the lugs, means to rotate the screw, and means operated by the rotation of the latter to swing the lever on the trunnions.

14. In a range finder, the combination of a sighting telescope, a cam for effecting angular adjustment of the latter in a vertical plane, a rotatable screw for adjusting the cam having an axially movable portion, a lever for controlling the axial movement of the latter, a collar on said axially movable portion, means to prevent relative axial movement between the latter and collar, lugs on the collar engaging longitudinal slots in the lower end of the lever, a nut having trunnions engaging the slots and adapted to be moved past the lugs in the latter, a screw for raising and lowering the nut arranged perpendicular to the rotatable screw, a gearing operated by the latter, a screw operated by said gear, and a nut moved axially by the last named screw and having lugs engaging slots in the upper end of the lever.

In testimony that I claim the foregoing as my invention, I have signed my name in presence of two subscribing witnesses.

FRIDTJOV ANDERSEN.

Witnesses:
C. FABRICIUS HANSEN,
THE. HERZ.

Copies of this patent may be obtained for five cents each, by addressing the "Commissioner of Patents, Washington, D. C."